(12) United States Patent
Abadir et al.

(10) Patent No.: US 11,184,173 B2
(45) Date of Patent: Nov. 23, 2021

(54) SECURE DISTRIBUTED INFORMATION SYSTEM

(71) Applicant: Powch, LLC, Lancaster, PA (US)

(72) Inventors: Essam Abadir, Lancaster, PA (US); Rosco Schock, Lancaster, PA (US); Joshua Risbeck Cox, Manassas, VA (US)

(73) Assignee: Powch, LLC, Lancaster, PA (US)

( * ) Notice: Subject to any disclaimer, the term of this patent is extended or adjusted under 35 U.S.C. 154(b) by 16 days.

(21) Appl. No.: 16/548,973

(22) Filed: Aug. 23, 2019

(65) Prior Publication Data

US 2020/0067701 A1 Feb. 27, 2020

Related U.S. Application Data

(60) Provisional application No. 62/735,592, filed on Sep. 24, 2018, provisional application No. 62/722,630, filed on Aug. 24, 2018, provisional application No. 62/722,410, filed on Aug. 24, 2018.

(51) Int. Cl.
| | |
|---|---|
| *H04L 29/06* | (2006.01) |
| *H04L 9/32* | (2006.01) |
| *H04L 9/08* | (2006.01) |
| *G06F 21/31* | (2013.01) |
| *G06F 21/60* | (2013.01) |
| *G06K 7/14* | (2006.01) |

(52) U.S. Cl.
CPC ............ *H04L 9/3234* (2013.01); *G06F 21/31* (2013.01); *G06F 21/602* (2013.01); *G06K 7/1413* (2013.01); *G06K 7/1417* (2013.01); *H04L 9/0819* (2013.01); *H04L 9/0825* (2013.01); *H04L 9/0863* (2013.01); *H04L 9/0877* (2013.01); *H04L 9/0891* (2013.01); *H04L 9/0894* (2013.01); *H04L 9/3213* (2013.01); *H04L 9/3247* (2013.01); *H04L 63/123* (2013.01); *H04L 63/18* (2013.01); *H04L 2463/082* (2013.01)

(58) Field of Classification Search
CPC ... H04L 9/3234; H04L 9/0819; H04L 9/0825; H04L 9/0863; H04L 9/0877; H04L 9/0891; H04L 9/0894; H04L 9/3213; H04L 9/3247; H04L 63/123; H04L 63/18; H04L 63/0428; H04L 2463/082; G06F 21/31; G06F 21/602; G06K 7/1413; G06K 7/1417

See application file for complete search history.

(56) References Cited

U.S. PATENT DOCUMENTS

| | | |
|---|---|---|
| 7,137,006 B1 | 11/2006 | Grandcolas et al. |
| 8,510,816 B2 | 8/2013 | Quach et al. |
| 8,578,454 B2 | 11/2013 | Grim |

(Continued)

*Primary Examiner* — Yogesh Paliwal
(74) *Attorney, Agent, or Firm* — Fox Rothschild LLP

(57) ABSTRACT

A method of sharing encrypted data includes, by an electronic device, receiving a password from a user to perform an action, receiving a salt value, generating a user key using the password and salt value, receiving an encrypted key location identifier value, decrypting the encrypted key location identifier value to obtain a key location identifier, receiving an encrypted read token value, decrypting the encrypted read token value using the user key to obtain a read token value, and transmitting the read token value and the key location identifier to a server electronic device.

34 Claims, 10 Drawing Sheets

(56) References Cited

U.S. PATENT DOCUMENTS

| | | |
|---|---|---|
| 8,627,088 B2 | 1/2014 | Mizrah |
| 9,055,029 B2 | 6/2015 | Narendra et al. |
| 9,077,713 B1 | 7/2015 | Zheng et al. |
| 9,094,212 B2 | 7/2015 | Thomas et al. |
| 9,313,185 B1 | 4/2016 | Pei |
| 9,369,289 B1 | 6/2016 | Harrison et al. |
| 9,985,786 B1 | 5/2018 | Bhabbur et al. |
| 2005/0210253 A1* | 9/2005 | Shigeeda ............... H04L 9/3213 713/171 |
| 2005/0273442 A1 | 12/2005 | Bennett et al. |
| 2009/0290715 A1 | 11/2009 | Mityagin et al. |
| 2010/0199089 A1 | 8/2010 | Vysogorets et al. |
| 2013/0145447 A1* | 6/2013 | Maron ................ H04L 63/0838 726/6 |
| 2013/0219473 A1 | 8/2013 | Schaefer |
| 2014/0337957 A1 | 11/2014 | Feekes |
| 2015/0124963 A1 | 5/2015 | Mccusker et al. |
| 2015/0169892 A1* | 6/2015 | Nord .................... G06F 21/6218 726/9 |
| 2015/0244525 A1 | 8/2015 | McCusker et al. |
| 2015/0318993 A1 | 11/2015 | Hamlin et al. |
| 2016/0065590 A1 | 3/2016 | Gramelspacher et al. |
| 2016/0248752 A1 | 8/2016 | Blinn |
| 2016/0286393 A1 | 9/2016 | Rasheed et al. |
| 2016/0307194 A1 | 10/2016 | Bhatnagar et al. |
| 2017/0180136 A1 | 6/2017 | Ibasco |
| 2017/0230363 A1 | 8/2017 | Deutschmann et al. |
| 2017/0272427 A1 | 9/2017 | Robison et al. |
| 2017/0288870 A1 | 10/2017 | Przydatek et al. |
| 2017/0324737 A1 | 11/2017 | Evans |
| 2017/0346804 A1 | 11/2017 | Beecham |
| 2018/0060558 A1 | 3/2018 | Bruderek et al. |
| 2018/0309740 A1 | 10/2018 | Brun et al. |
| 2019/0068585 A1 | 2/2019 | Zeng et al. |
| 2019/0095606 A1 | 3/2019 | Lewis et al. |
| 2020/0099539 A1 | 3/2020 | Bernsen et al. |
| 2020/0235932 A1 | 7/2020 | Gehrmann |

\* cited by examiner

SECURE DISTRIBUTED INFORMATION SYSTEM

CROSS-REFERENCE TO RELATED APPLICATIONS

This application claims priority to: (1) U.S. Patent Application No. 62/722,630, filed Aug. 24, 2018; (2) U.S. Patent Application No. 62/722,410, filed Aug. 24, 2018; and (3) U.S. Patent Application No. 62/735,592, filed Sep. 24, 2018. The disclosures of each priority application are fully incorporated into this document by reference.

BACKGROUND

Many computing devices maintain data sets that contain private information and data, such as healthcare data, payment information, personal data, or other such data. Computing devices attempt to protect such data by restricting access to the data and encrypting the data. However, in some instances, it may be beneficial to make the encrypted data available to other devices, such as other devices accessible via a computing network. Typical data sharing mechanisms require encrypted data to be fully unencrypted before being transmitted to a different device, which increases the risk that the data may be compromised.

SUMMARY

In an embodiment, a method of sharing of encrypted data includes, by an electronic device, receiving a password from a user in order to perform an action, receiving a salt value, generating a user key using the password and the salt value, receiving an encrypted key location identifier value, decrypting the encrypted key location identifier value to obtain a key location identifier, receiving an encrypted read token value, decrypting the encrypted read token value using the user key to obtain a read token value, and transmitting the read token value and the key location identifier to a server electronic device. The method includes, by the server electronic device, receiving the read token value and the key location identifier from the electronic device, verifying that the read token corresponds to information stored in a memory location associated with the key location identifier, and in response to verifying that the read token corresponds to information stored in the memory location associated with the key location identifier, transmitting an encrypted encryption key to the electronic device.

The method may include by the electronic device, receiving the encrypted encryption key, obtaining an encryption key by decrypting the encrypted encryption key using the user key, decrypting an encrypted secret value using the encryption key value to obtain a secret value, and performing the action using the secret value. The secret value, the password, the user key, the encryption key, the read token and the key identifier value may be deleted from a data store of the electronic device.

Optionally, receiving a salt value may include retrieving the salt value from a data store of the electronic device. Generating a user key using the password and the salt value may include appending the salt value to the password. Receiving an encrypted read token may include retrieving the encrypted read token from a data store of the electronic device.

The method may include enabling the sharing of encrypted data by, by the electronic device, receiving a secret value, generating an encryption key, generating an encrypted secret value by encrypting the secret value with the encryption key, and storing the encrypted secret value in a data store of the electronic device. Generating an encryption key may include generating the encryption key based at least on input received from one or more of the following: a microphone of the electronic device, an accelerometer of the electronic device, or a touch screen of the electronic device. The electronic device may receive the password, generate the salt value, generate the user key using the password and the salt value, and generate the encrypted encryption key by encrypting the encryption key with the user key. The electronic device may generate a security token, a read token, and a delete token, and transmit the encrypted encryption key, the security token, the read token, and the delete token to the server electronic device.

The server electronic device may write the encrypted encryption key, the security token, the read token, and the delete token to a memory location of a data store of the server electronic device, and send the key location identifier to the electronic device, where the key location identifier uniquely identifies the memory location.

The electronic device may generate the encrypted key location identifier value by encrypting the key location identifier with the user key, and store the encrypted key location identifier value in a data store of the electronic device.

The electronic device may create a secret backup value by combining a secret value with the password to generate a combination value, and encrypting the combination value with the password, create a machine-readable image that encodes the secret backup value, and cause a print device in communication with the electronic device to print the machine-readable image onto a physical substrate. The electronic device may cause a print device in communication with the electronic device to print the machine-readable image onto a physical substrate without displaying the machine-readable image on a display device of the electronic device.

The method may include extracting, by a scanning device of the electronic device, a value that is encoded in the machine-readable image printed on the physical substrate, receiving the password from the user, decrypting the extracted value using the password to obtain a decrypted value, and verifying that the decrypted value matches the combination value.

The electronic device may create a combination value by combining the key location identifier, a delete token, and the password, generate a destruct backup value by encrypting the combination value with the password, create a machine-readable image that encodes the destruct backup value, and cause a print device in communication with the electronic device to print the machine-readable image onto a physical substrate.

The method may include extracting, by a scanning device of the electronic device, a value that is encoded in a machine-readable image printed on a physical substrate, receiving the password from the user, decrypting the extracted value using the password to obtain a decrypted value, verifying that the decrypted value matches the combination value, and transmitting the key location identifier, the delete token and the password to the server electronic device. The server electronic device may verify that the value of the delete token corresponds to information stored at a memory location of a data store of the server electronic device that corresponds to the key location identifier, and in response to verifying that the value of the delete token corresponds to information stored at the memory location, delete the delete token and the encrypted user key from the memory location.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
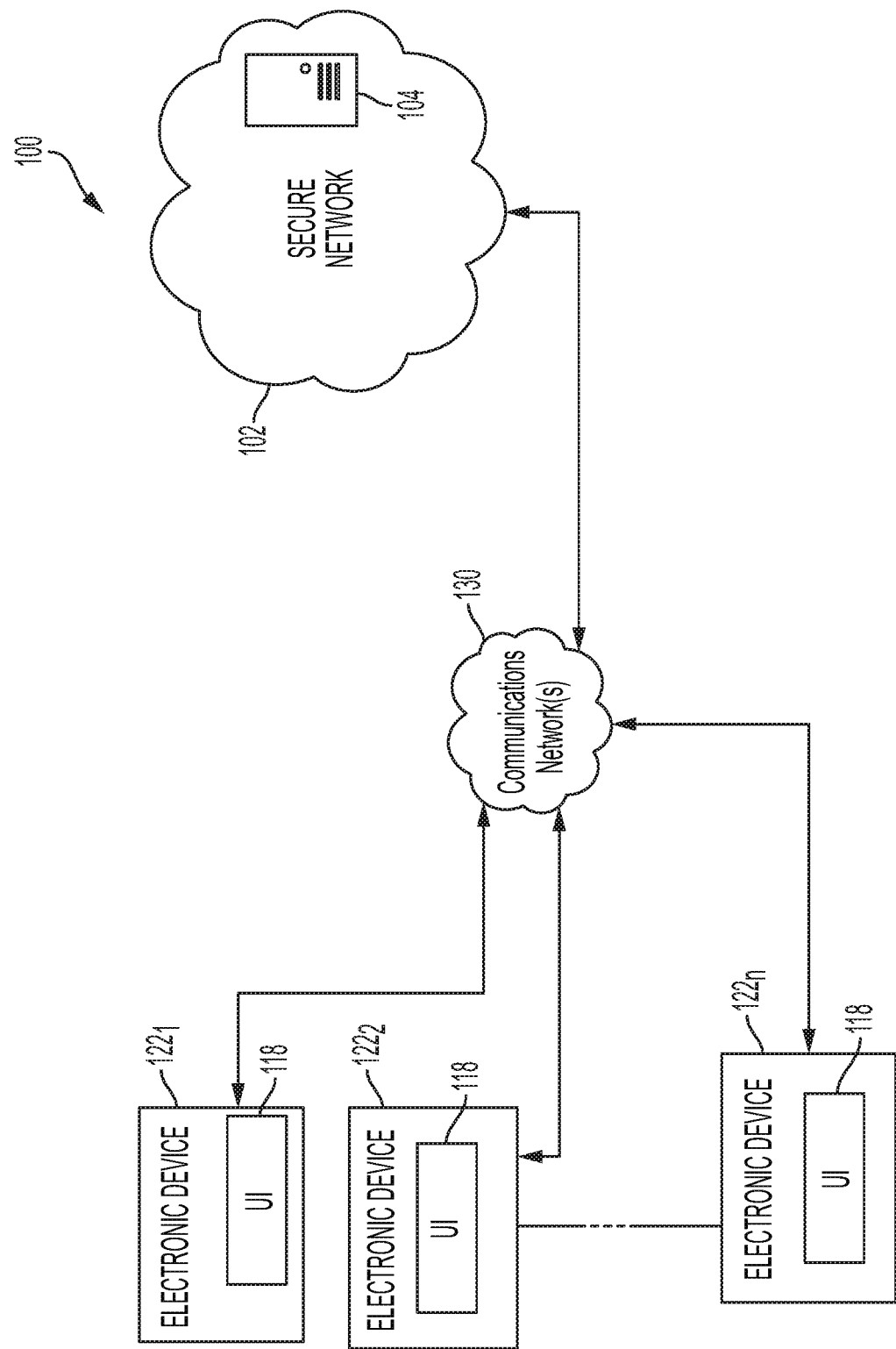
FIG. 1 is a block diagram illustrating an example computing environment for sharing of encrypted data.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include, for example, smartphones, personal digital assistants, cameras, tablet devices, electronic readers, personal computers, servers, and the like.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such "first" and "second" are used to modify a noun, such use is simply intended to distinguish one item from another, and is not intended to require a sequential order unless specifically stated.

Aspects of the present disclosure involve systems and methods for sharing secret data and information, such as health data, payment information, encryption private keys, login credentials, etc., between a first device and second different device, wherein the secret data and information was originally stored in encrypted form on the first device. To enable sharing of the secret data with the second device, the disclosed system automatically transmits portions of encrypted data and other tokens needed to enable the second device to download an appropriate decryption key and decrypt the data.

To enable the download of the decryption key at the second, different device, the system receives an authorization indication from the first device that provides the second device with the ability to download the appropriate decryption key to access the encrypted data. Alternatively, the system may receive a revoke indication from the first device, indicating that the authorization indication should be revoked and that the download capacity of the different device should be terminated.

Typical data sharing mechanisms either cannot share encrypted data between different devices (i.e., between the original device storing the encrypted data and another different device) in any capacity, or cannot share encrypted data without first decrypting the data and subsequently transferring the unencrypted data to the desired location. The present application describes solving these specific technical problems, among others, by a system that uses portions of encrypted data and tokens to authenticate the identity of a given computing device and provide a decryption key to the device, so that the device can decrypt and access secret data and information originally encrypted and stored at a different computing device.

FIG. 1 illustrates an example of a computer network 100 (e.g., a telecommunications network) that may be used to share encrypted data between a device that originally stored the data and a different device. Generally, the computer network 100 includes various devices communicating and functioning together to enable secret data share between a first device and a second, different, device. As illustrated, a communications network 130 allows for communication in the computer network 100. The communications network 130 may include one or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wde Area Network (VWVAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Network 130 may also include wired networks.

The computer network 100 includes one of the one or more electronic devices $122_1, 122_2, \ldots 122_N$, which may be may be a personal computer, work station, mobile device, mobile phone, tablet device, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more electronic devices $122_1, 122_2, \ldots 122_N$, may include one or more processors that process software or other machine-readable instructions and may include a memory to store the software or other machine-readable instructions and data. In various embodiments, an application or other interface of an electronic device $122_1, 122_2, \ldots 122_N$ may permit the electronic device to communicate with a service electronic device, a server electronic device or another electronic device. For example, an Internet browser or an application that is installed on an electronic device may be used.

A user may interact with one or more electronic devices $122_1, 122_2, \ldots 122_N$ to enable the sharing of secret data, originally encrypted and stored on any one of the one or more electronic devices $122_1, 122_2, \ldots 122_N$, with another device, such as another one of the one of the one or more electronic devices $122_1, 122_2, \ldots 122_N$. In particular, the user may interact with a particular one of the one or more electronic devices $122_1, 122_2, \ldots 122_N$ to provide input that allows the particular one of the one or more electronic devices $122_1, 122_2, \ldots 122_N$ to share secret data originally stored and encrypted on the particular one or more electronic devices $122_1, 122_2, \ldots 122_N$ with a different electronic device of the one or more electronic devices $122_1, 122_2, \ldots 122_N$.

The user input may be transmitted to a secure network 102, which may be any type of private communications computing network including one or more computing devices, such as server 104. In one specific example, the secure network 102 and/or server 104 may manage the ability of one or more of the electronic devices $122_1, 122_2, \ldots 122_N$ to share private and/or encrypted data with another different device, such as one of the one or more electronic devices $122_1, 122_2, -122_N$ other than the particular electronic device originally storing the private and encrypted data.

Figure 2:
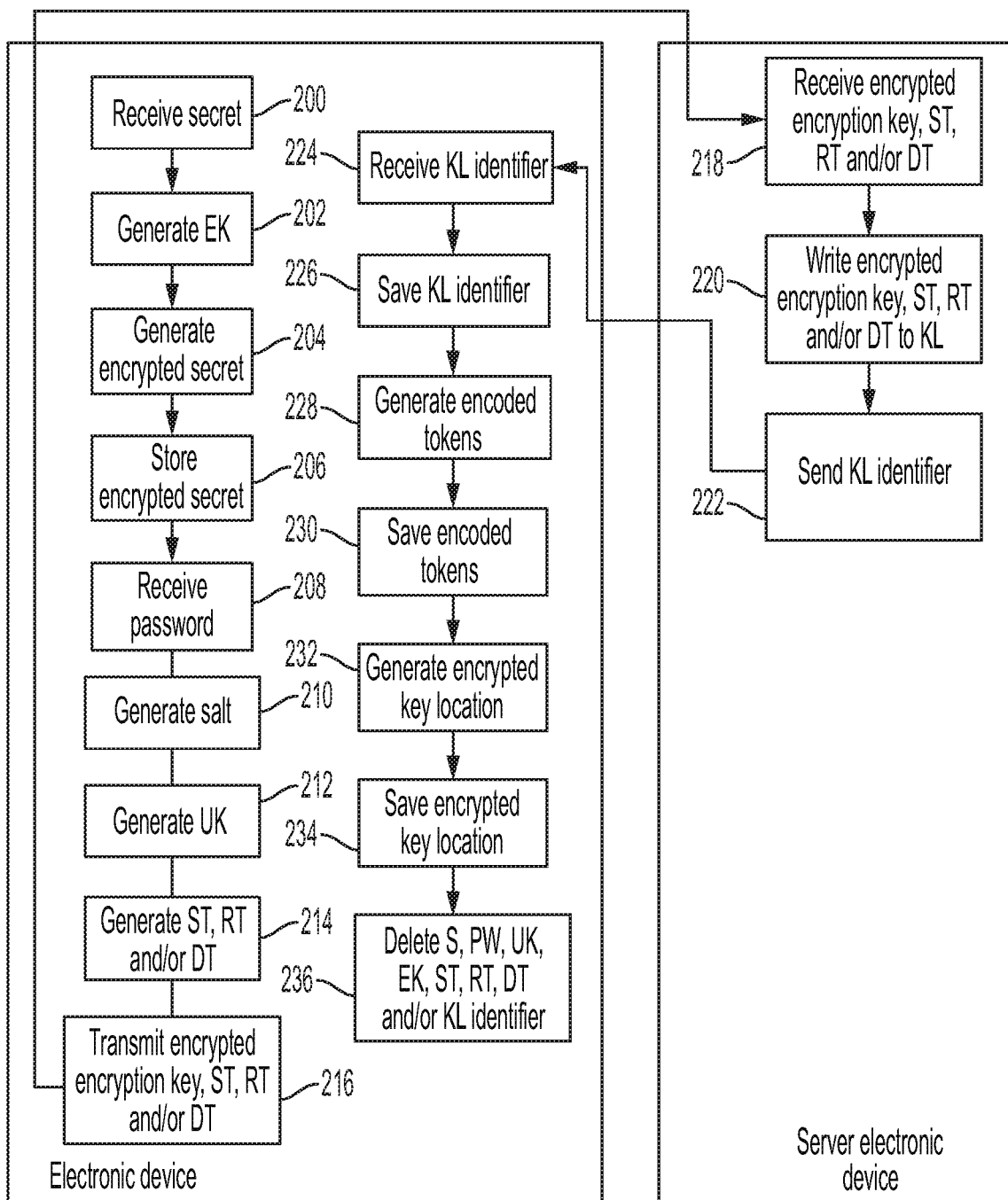
FIG. 2 illustrates an example method of enabling the sharing of encrypted secret data.

FIG. 2 illustrates an example method of enabling the sharing of encrypted secret data according to an embodiment. At least a portion of the method may be implemented and/or executed by the computing network 100 of FIG. 1. As illustrated by FIG. 2, an electronic device may receive 200 secret data (S). Secret data may be information that is only known to the electronic device. In various embodiments, secret data may be provided to an electronic device by a user. For example, a user may provide S to an electronic device via a cut and paste or copy command. As another example, an electronic device may receive S via an image capture device (e.g., a camera). An image capture device may be any suitable component capable of receiving an optical image and transmitting the information to other components for processing. As another example, an electronic device may receive S via a wireless communication channel such as, for example, a Bluetooth connection. For example, an electronic device may have a transmitter and/or receiver configured to facilitate short-range communication with one or more other electronic devices that are in proximity.

The electronic device may generate 202 an encryption key (EK). The encryption key may be a strong encryption key, such as, for example a 256-bit encryption key. In an embodiment, the electronic device may generate 202 an encryption key that is based on input received by the electronic device. For instance, the electronic device may generate 202 an encryption key that is based, at least in part on input received via a microphone or other input audio device of an electronic device, information obtained by an accelerometer of an electronic device, information received via a touch screen or other input device of an electronic device, information received via a secure application program interface (API), and/or the like.

In an embodiment, the electronic device may generate 204 an encrypted secret. For example, the electronic device may encrypt S using EK to generate 204 an encrypted secret ($S^{EK}$). The electronic device may store 206 $S^{EK}$ in a data store associated with the electronic device such as, for example, operating system storage on the electronic device or a data store that is accessible by the electronic device.

An electronic device may receive 208 a password (PW). The password may be received by an electronic device from a user via one or more input devices such as, for example, a keyboard, a touch screen, a microphone, a biometric and/or the like. In various embodiments, the password may conform to one or more guidelines, limitations or restrictions. For example, if the password is a character string, it may be required to be at least ten characters. Additional and/or alternate guidelines, limitations or restrictions may be used within the scope of this disclosure.

An electronic device may generate 210 a salt value (SA). The SA may be randomly generated. In various embodiments, an electronic device may generate 212 a user key (UK) that is based on the SA and the PW. For example, the electronic device may provide the SA and the PW to a one-way hash function to generate 212 a user key. For example, the SA may be attached to the PW to generate UK. Additional and/or alternate functions may be performed within the scope of this disclosure. The electronic device may encrypt EK with UK to generate an encrypted encryption key ($EK^{UK}$).

In various embodiments, an electronic device may generate 214 a security token (ST), a read token (RT) and/or a delete token (DT). One or more of the generated tokens may extend one or more benefits or privileges to a holder of the token. For example, a ST may grant to its holder access to certain secret or private information. As another example, a RT may permit its owner to read certain secret or private information. And as another example, a DT may permit its owner to delete certain secret or private information. One or more of the ST, RT and/or DT may be randomly generated. The electronic device may transmit 216 $EK^{UK}$, ST, RT and/or DT to a server electronic device.

The server electronic device may receive 218 $EK^{UK}$, ST, RT and/or DT, and may write 220 $EK^{UK}$, ST, RT and/or DT to a memory location (KL). KL may be a new location in a data store that is associated with the server electronic device. For example, a data store of the server electronic device or a data store that is accessible by the server electronic device. In various embodiments, KL may be randomly selected by the server electronic device.

The server electronic device may send 222 a KL identifier to the electronic device. The KL identifier may be an address or other identifier that uniquely identifies KL. The electronic device may receive 224 the KL identifier and may save 226 the KL identifier in a data store associated with the electronic device.

In various embodiments, the electronic device may encrypt RT, ST and/or DT with UK to generate 228 one or more of the following encrypted tokens: $RT^{UK}$, $ST^{UK}$, $DT^{UK}$. The electronic device may save 230 $RT^{UK}$, $ST^{UK}$, $DT^{UK}$ to a data store associated with the electronic device.

The electronic device may encrypt the KL identifier with UK to generate 232 an encrypted key location identifier value ($KL^{UK}$). The electronic device may save 234 $KL^{UK}$ to a data store associated with the electronic device. The electronic device may delete 236 S, PW, UK, EK, ST, RT, DT and/or the KL identifier from the data store.

Figure 3:
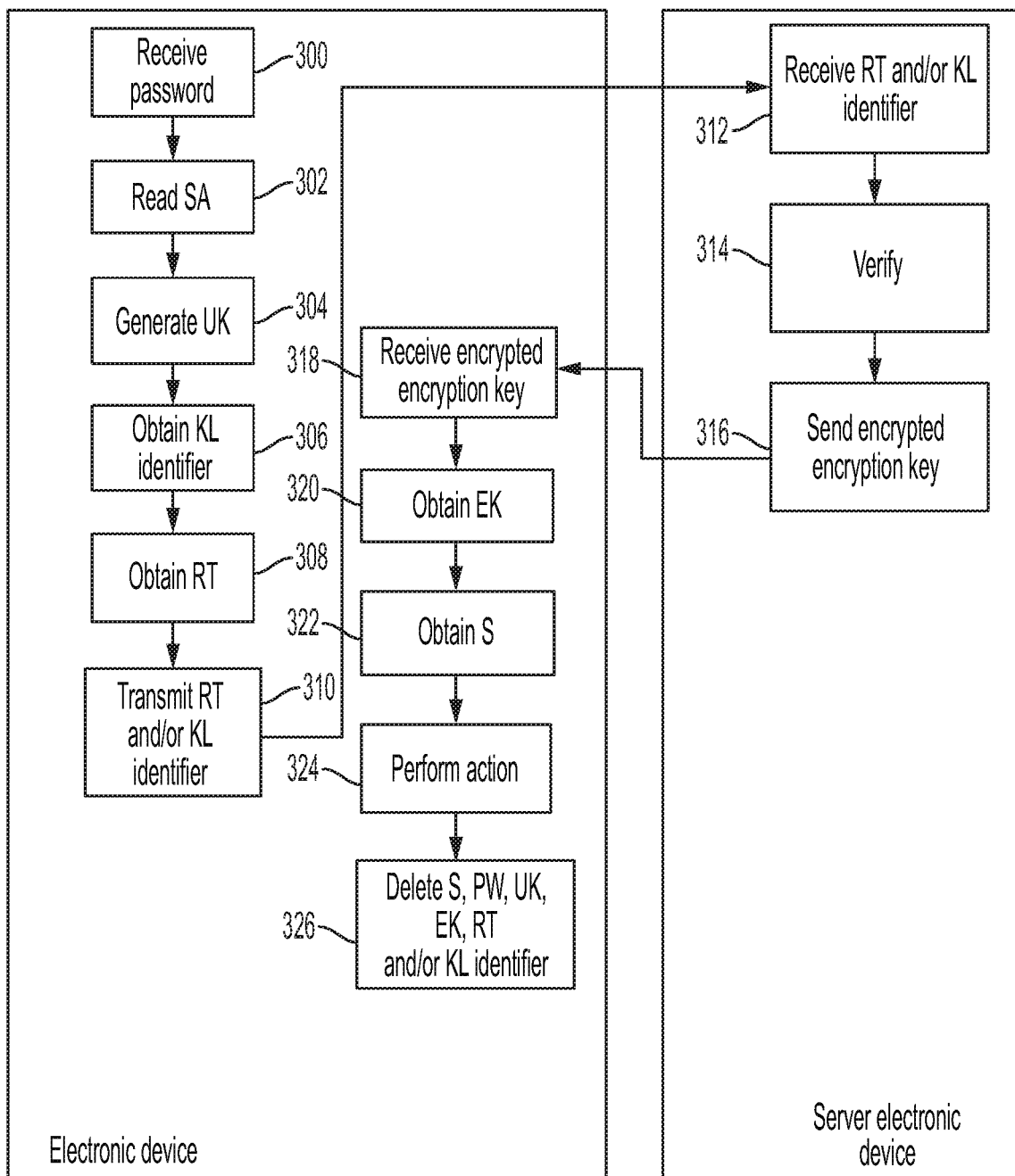
FIG. 3 illustrates an example method of retrieving and decrypting encrypted secret data.

FIG. 3 illustrates an example method of sharing encrypted secret data according to an embodiment. As illustrated by FIG. 3, an electronic device may receive 300 PW. The PW may be provided to an electronic device in order to perform an action. For example, a user may wish to access information, content, a service, an application, and/or the like, and may provide PW in order to do so. The PW may be specific to a user, and account, and/or an electronic device.

The electronic device may receive 300 PW from a user, another electronic device and/or the like. The electronic device may read 302 SA from memory, and may generate 304 UK using PW and SA. For example, as discussed above, an electronic device may attach SA to PW to generate UK.

The electronic device may read the encrypted key location identifier value ($KL^{UK}$) from memory. The electronic device may decrypt $KL^{UK}$ using UK to obtain 306 an un-encrypted KL identifier. The electronic device may read $RT^{UK}$ from memory, and may decrypt $RT^{UK}$ using UK to obtain 308 an un-encrypted RT. The electronic device may transmit 310 RT and/or the KL identifier to the server electronic device.

The server electronic device may receive 312 RT and/or the KL identifier. The server electronic device may verify 314 that RT corresponds to information stored at the memory location associated with the KL identifier (KL). For example, the server electronic device may verify 314 that RT corresponds to information stored at KL. For example, the server electronic device may verify 314 that RT matches information stored at KL. In response to verifying that RT corresponds to information stored at KL, the server electronic device may send 316 $EK^{UK}$ to the electronic device. The electronic device may receive 318 $EK^{UK}$ and may obtain 320 EK by decrypting $EK^{UK}$ with UK. The electronic device may read $S^{EK}$ from a data store, and may obtain 322 S by decrypting $S^{EK}$ with EK.

The electronic device may perform 324 the user-specified action using S. The electronic device may delete 326 S, PW, UK, EK, RT and/or the KL identifier from one or more data stores associated with the electronic device.

In various embodiments, an electronic device may perform a backup of the secret, S. S may be backed up during initialization or setup, for example during the process illustrated by FIG. 2. S may be backed up during usage, for example during the process illustrated by FIG. 3.

Figure 4:
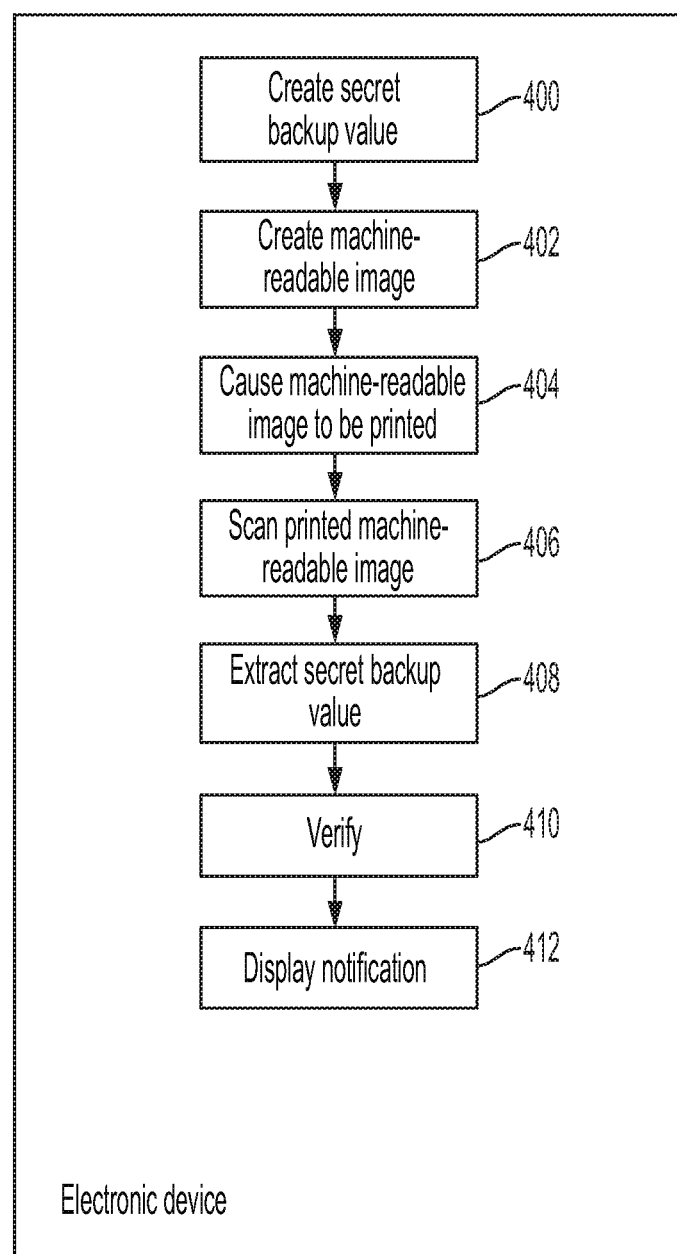
FIG. 4 illustrates an example method backing up a user's secret data.

FIG. 4 illustrates an example method of performing a backup according to an embodiment. As illustrated by FIG. 4, an electronic device may combine S and PW, and encrypt the combined value with PW to create 400 a secret backup value, $S^{PW}$. For example, the combined value may be represented by S+PW. The electronic device may create 402 a machine-readable image that includes $S^{PW}$. For example, the electronic device may create a Quick Response (QR) code or a barcode that includes $S^{PW}$ in an encoded format.

The electronic device may cause 404 the machine-readable image to be printed on a physical substrate (e.g., paper) at a print device that is in communication with the electronic device. In various embodiments, the electronic device may cause 404 the machine-readable image to be automatically printed at a print device without displaying the machine-readable image on a display device before printing.

The electronic device may scan 406 the printed machine-readable image, and extract 408 information from the machine-readable image. For example, a barcode scanner and/or a QR code scanner of an electronic device or that is in communication with an electronic device may scan 406 a printed machine-readable image that is printed on a physical substrate and extract 408 information from the machine-readable image.

The electronic device may compare the extracted information with the $S^{PW}$ value that was created in 400 to verify 410 that they correspond. The electronic device may cause 412 a notification to be displayed to a user as to whether the verification was successful. If the verification was not successful, the electronic device may repeat the backup process to generate a new machine-readable image. If the verification was successful, the user may save the printed machine-readable image in a safe location.

Figure 5:
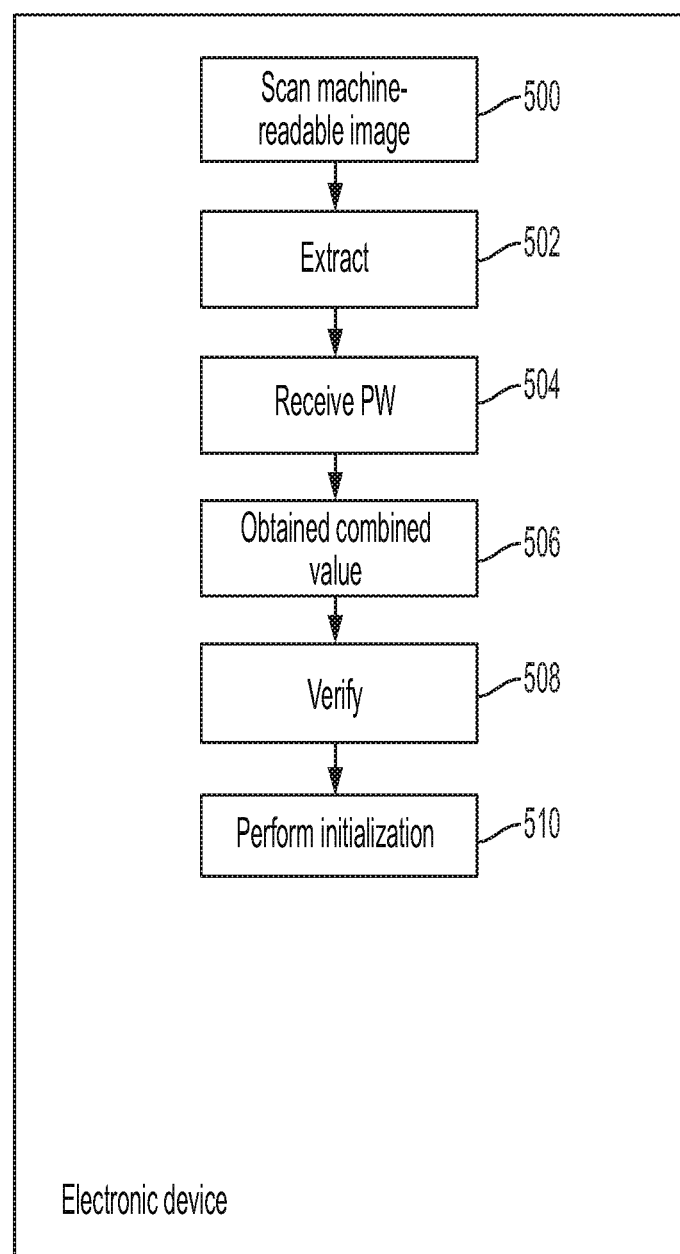
FIG. 5 illustrates an example method of restoring a user's secret data.

In various embodiments, an electronic device may perform a restoration process using the machine-readable image that is printed as described above with respect to FIG. 4. An example restoration process is illustrated by FIG. 5. As illustrated, an electronic device may scan 500 a printed machine-readable image from a physical substrate and extract 502 encoded information from the machine-readable image. For example, a barcode scanner and/or a QR code scanner of an electronic device or that is in communication with an electronic device may scan 500 a printed machine-readable image and extract 502 information that is encoded in the machine-readable image.

The electronic device may receive 504 PW from a user. In various embodiments, the electronic device may prompt a user to provide PW. The electronic device may obtain 506 a decrypted value by decrypting the extracted encoded information using PW. The electronic device may verify 508 that the obtained decrypted value corresponds to the combined value of S and PW. In response to verifying that the obtained decrypted value corresponds to the combined value of S and PW, the electronic device may perform 510 an initialization or setup process, such as the one discussed above with respect to FIG. 1.

Figure 6:
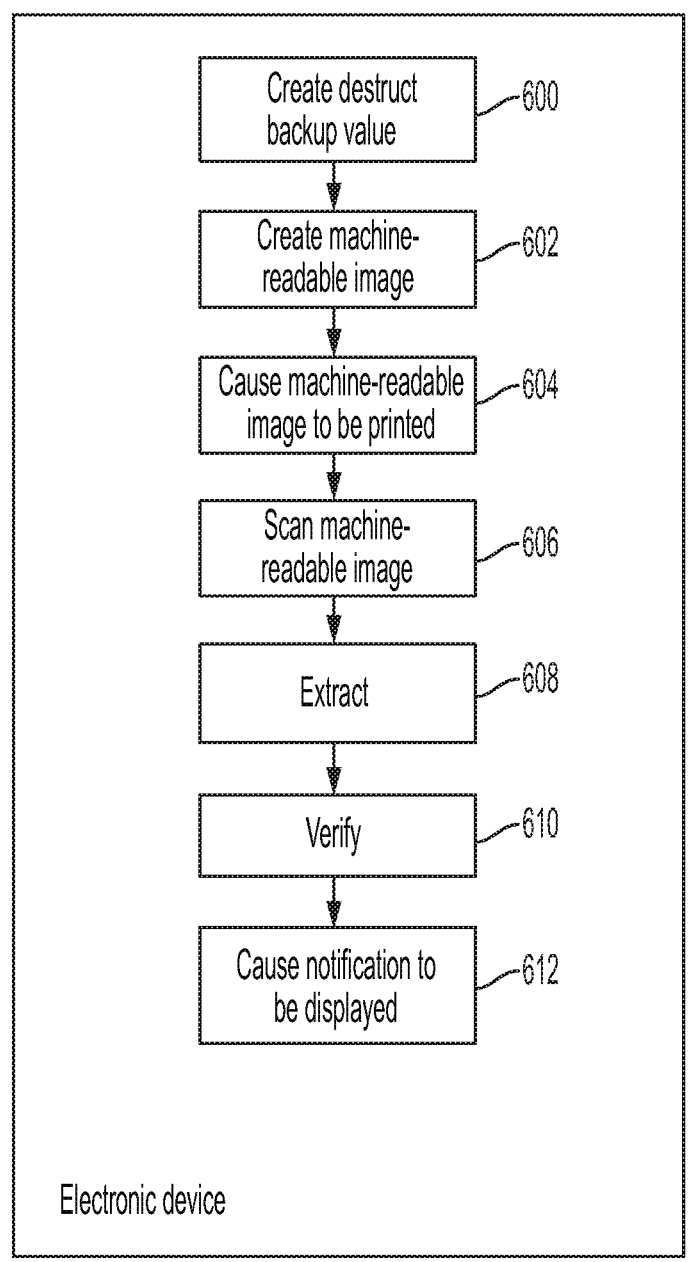
FIG. 6 illustrates an example method of creating commands to delete encrypted secret data.

In various embodiments, an electronic device may utilize a destruction process to delete the encrypted encryption key ($EK^{UK}$) from KL. FIG. 6 illustrates an example method of creating instructions to initialize a destruct process according to an embodiment. As illustrated by FIG. 6, an electronic device may create 600 a destruct backup value ($D^{PW}$) by encrypting a combination value that represents a combination of the KL identifier, DT and PW with PW. For example, an electronic device may encrypt the value KL identifier+DT+PW with PW to generate $D^{PW}$.

The electronic device may create 602 a machine-readable image that includes $D^{PW}$. For example, the electronic device may create a QR code or a barcode that includes $D^{PW}$ in an encoded format.

The electronic device may cause 604 the machine-readable image to be printed on a physical substrate at a print device that is in communication with the electronic device. In various embodiments, the electronic device may cause 604 the machine-readable image to be automatically printed at a print device without displaying the machine-readable image on a display before printing.

The electronic device may scan 606 the printed machine-readable image from a physical substrate, and extract 608 $D^{PW}$ from the machine-readable image. For example, a barcode scanner and/or a QR code scanner of an electronic device or that is in communication with an electronic device may scan 606 a printed machine-readable image and extract 608 information from the machine-readable image.

The electronic device may compare the extracted information with the $D^{PW}$ value that was created in 600 to verify 610 that they match. The electronic device may cause 612 a notification to be displayed to a user as to whether the verification was successful. If the verification is successful, the user may save the printed machine-readable image in a safe location.

Figure 7:
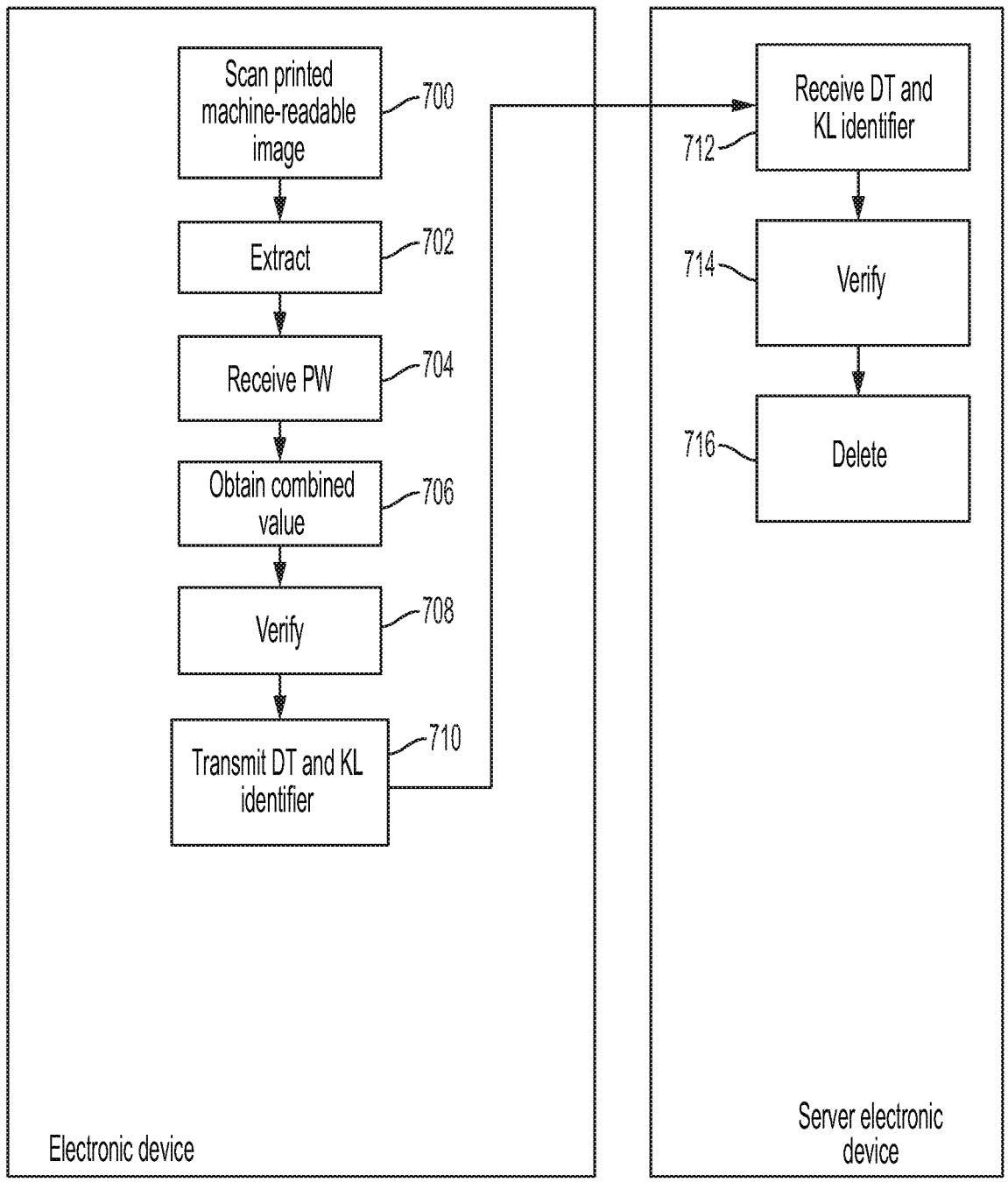
FIG. 7 illustrates an example method of executing commands to delete encrypted secret data.

FIG. 7 illustrates an example method of performing a destruction process according to an embodiment. As illustrated by FIG. 7, an electronic device may scan 700 a printed machine-readable image and extract 702 information that is encoded within the machine-readable image. For example, a barcode scanner and/or a QR code scanner of an electronic device or that is in communication with an electronic device may scan 700 a printed machine-readable image and extract 702 encoded information from the machine-readable image.

The electronic device may receive 704 PW from a user. In various embodiments, the electronic device may prompt a user to provide PW. The electronic device may obtain 706 a decrypted value by decrypting the extracted encoded information using PW. The electronic device may verify 708 that the decrypted value corresponds to the combined value of KL identifier, DT and PW. In response to verifying that the decrypted value corresponds to the combined value of KL identifier, DT and PW, the electronic device may transmit 710 DT and KL identifier to the server electronic device. The server electronic device may receive 712 DT and KL identifier, and may verify 714 that DT corresponds to information stored at KL. For example, the server electronic device may verify 714 that DT matches information stored at KL. In response to verifying that DT corresponds to information stored at KL, the server electronic device may delete 716 DT and $EK^{UK}$ from KL.

Figure 8:
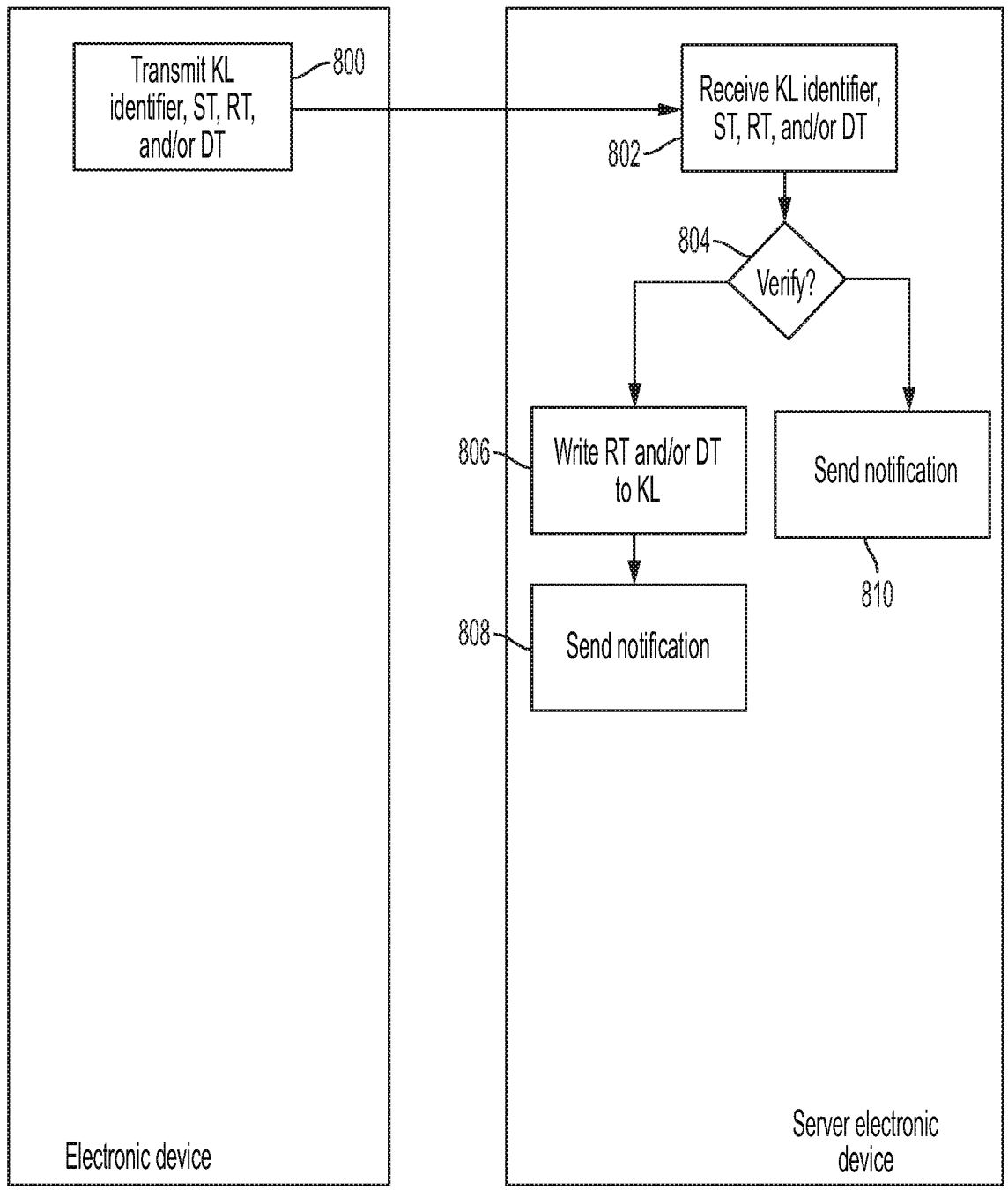
FIG. 8 illustrates an example method of granting third party access to encrypted secret data.

In various embodiments, an electronic device may grant a third party access to at least a portion of encrypted secret data. FIG. 8 illustrates an example method of granting a third party access to at least a portion of encrypted secret data according to an embodiment. The method may be performed as part of initialization, such as the process illustrated by FIG. 2, or as part of usage such as, for example, during the process illustrated by FIG. 3. In various embodiments, the access that is granted may be an ability to read, write and/or delete encrypted secret data as described in more detail above.

In various embodiments, the owner of secret data may want to make at least a portion of that secret data available to a third party. The owner may provide the third party with a token value and the KL identifier associated with the location (KL) where the secret data of interest is stored. For example, if the owner would like the third party to have the ability to read the secret data, the owner may provide the third party with RT. Additional and/or alternate tokens and/or privileges may be used within the scope of this disclosure. In various embodiments, the owner of the secret data may provide a third party with a token and KL identifier in any suitable means such as for example, via an electronic message, a short-range communication, a drop box and/or the like. As such, the owner of the data can provide the tools that the third party can use to access the secret data while maintaining control over when that data becomes available to the third party. For example, simply providing the third party with one or more tokens and a location identifier will not be beneficial to the third party until the data of interest is actually written to the location.

When the owner of the data is ready to share information with a third party, as illustrated by FIG. 8, an electronic device may transmit 800 KL identifier, ST, RT and/or DT to a server electronic device. The server electronic device may receive 802 KL identifier, ST, RT and/or DT. The server electronic device may verify 804 that ST corresponds to information stored at KL. For example, the server electronic device may verify 804 that ST matches information stored at KL. In response to verifying that ST corresponds to information stored at KL, the server electronic device may write 806 RT and/or DT to KL, and may send 808 a notification to the electronic device that the process was successful. In response to verifying that ST does not correspond to information stored at KL, the server electronic device may send 810 a notification to the electronic device that the process was unsuccessful.

Figure 9:
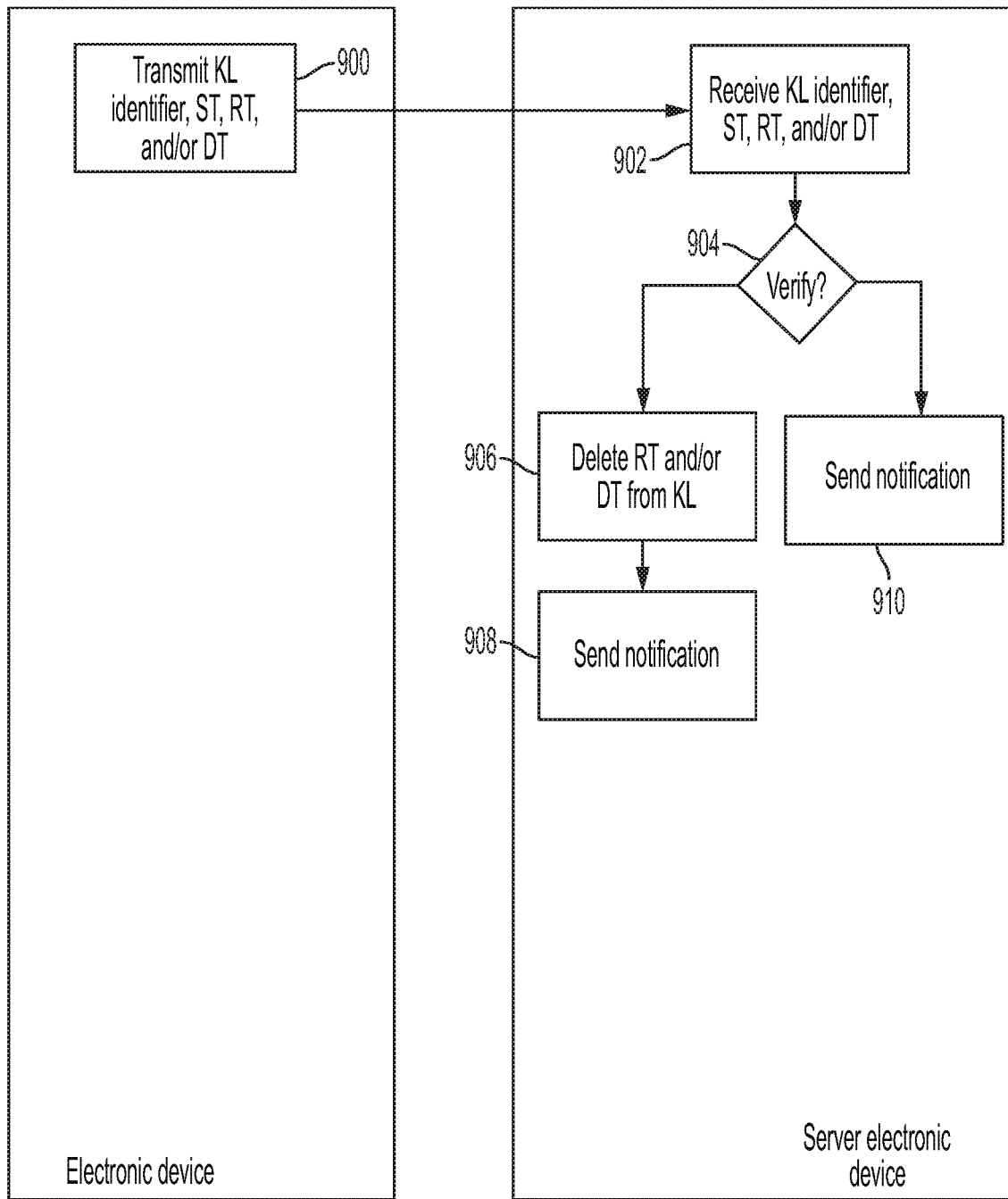
FIG. 9 illustrates an example processing of revoking third party access to encrypted secret data.

FIG. 9 illustrates an example processing of revoking access to encrypted secret data according to an embodiment. Similar to the discussion above with respect to FIG. 8, an owner of secret data may have already shared one or more tokens and/or a location identifier with a third party. In this situation, the third party, or perhaps a different party, may revoke access to the secret data by deleting it from KL.

As illustrated by FIG. 9, an electronic device may transmit 900 KL identifier, ST, RT and/or DT to a server electronic device. The electronic server may receive 902 KL identifier, ST, RT and/or DT, and may verify 904 that ST corresponds to information stored at KL. In response to verifying that ST corresponds to information stored at KL, the server electronic device may delete 906 RT and/or DT from KL, and may send 908 a notification to the electronic device that the process was successful. In response to verifying that ST does not correspond to information stored at KL, the server electronic device may send 910 a notification to the electronic device that the process was unsuccessful.

Figure 10:
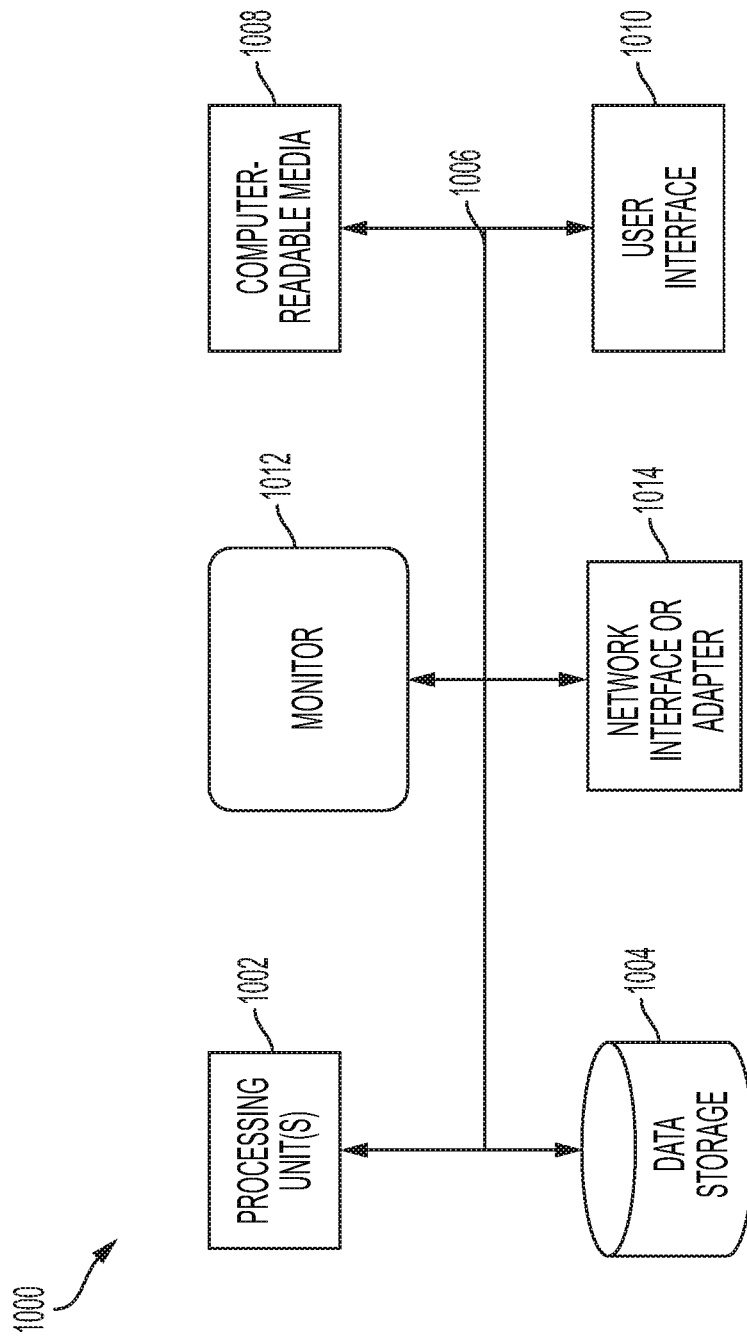
FIG. 10 illustrates an example of a computing and networking environment that may be used to implement various aspects of the present disclosure

FIG. 10 illustrates an example of a computing and networking environment 1000 that may be used to implement various aspects of the present disclosure, such as those described in FIGS. 2-9. As illustrated, the computing and networking environment 1000 includes a general purpose computing device 1000, although it is contemplated that the networking environment 1000 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 1000 may include various hardware components, such as a processing unit 1002, a data storage 1004 (e.g., a system memory), and a system bus 1006 that couples various system components of the computer 1000 to the processing unit 1002. The system bus 1006 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus also known as Mezzanine bus.

The computer 1000 may further include a variety of computer-readable media 1008 that includes removable/non-removable media and volatile/nonvolatile media, but excludes transitory propagated signals. Computer-readable media 1008 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 1000. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 1004 includes computer storage media in the form of volatile/nonvolatile memory such as read only memory (ROM) and random access memory (RAM). A basic input/output system (BIOS), containing the basic routines that help to transfer information between elements within the computer 1000 (e.g., during start-up) is typically stored in ROM. RAM typically contains data and/or program modules that are immediately accessible to and/or presently being operated on by processing unit 1002. For example, in one embodiment, data storage 1004 holds an operating system, application programs, and other program modules and program data.

Data storage 1004 may also include other removable/non-removable, volatile/nonvolatile computer storage media. For example, data storage 1004 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 10, provide storage of computer-readable instructions, data structures, program modules and other data for the computer 1000.

A user may enter commands and information through a user interface 1010 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 1002 through a user interface 1010 that is coupled to the system bus 1006, but may be connected by other interface and bus structures, such as a parallel port, game port or a universal serial bus (USB). A monitor 1012 or other type of display device is also connected to the system bus 1006 via an interface, such as a video interface. The monitor 1012 may also be integrated with a touch-screen panel or the like.

The computer 1000 may operate in a networked or cloud-computing environment using logical connections of a network interface or adapter 1014 to one or more remote devices, such as a remote computer. The remote computer may be a personal computer, a server, a router, a network PC, a peer device or other common network node, and typically includes many or all of the elements described above relative to the computer 1000. The logical connections depicted in FIG. 10 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1000 may be connected to a public and/or private network through the network interface or adapter 1014. In such embodiments, a modem or other means for establishing communications over the network is connected to the system bus 1006 via the network interface or adapter 1014 or other appropriate mechanism. A wireless networking component including an interface and antenna may be coupled through a suitable device such as an access point or peer computer to a network. In a networked environment, program modules depicted relative to the computer 1000, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method of sharing of encrypted data, the method comprising:
   by an electronic device:
   receiving a password from a user in order to perform an action,
   receiving a salt value,
   generating a user key using the password and the salt value,
   receiving an encrypted key location identifier value,
   decrypting the encrypted key location identifier value to obtain a key location identifier,
   receiving an encrypted read token value,
   decrypting the encrypted read token value using the user key to obtain a read token value, transmitting the read token value and the key location identifier to a server electronic device, by the server electronic device:
receiving the read token value and the key location identifier from the electronic device,
verifying that the read token corresponds to information stored in a memory location associated with the key location identifier, and
in response to verifying that the read token corresponds to information stored in the memory location associated with the key location identifier, transmitting an encrypted encryption key to the electronic device.

2. The method of claim 1, further comprising:
by the electronic device:
receiving the encrypted encryption key,
obtaining an encryption key by decrypting the encrypted encryption key using the user key,
decrypting an encrypted secret value using the encryption key value to obtain a secret value, and
performing the action using the secret value.

3. The method of claim 2, further comprising deleting the secret value, the password, the user key, the encryption key, the read token and the key identifier value from a data store of the electronic device.

4. The method of claim 1, wherein receiving a salt value comprises retrieving the salt value from a data store of the electronic device.

5. The method of claim 1, wherein generating a user key using the password and the salt value comprises appending the salt value to the password.

6. The method of claim 1, wherein receiving an encrypted read token comprises retrieving the encrypted read token from a data store of the electronic device.

7. The method of claim 1, further comprising enabling the sharing of encrypted data by:
by the electronic device:
receiving a secret value,
generating an encryption key,
generating an encrypted secret value by encrypting the secret value with the encryption key, and
storing the encrypted secret value in a data store of the electronic device.

8. The method of claim 7, wherein generating an encryption key comprises generating the encryption key based at least on input received from one or more of the following:
a microphone of the electronic device;
an accelerometer of the electronic device; or
a touch screen of the electronic device.

9. The method of claim 7, further comprising:
by the electronic device:
receiving the password,
generating the salt value,
generating the user key using the password and the salt value, and
generating the encrypted encryption key by encrypting the encryption key with the user key.

10. The method of claim 9, further comprising:
by the electronic device:
generating a security token, a read token, and a delete token, and
transmitting the encrypted encryption key, the security token, the read token, and
the delete token to the server electronic device.

11. The method of claim 10, further comprising:
by the server electronic device:
writing the encrypted encryption key, the security token, the read token, and the delete token to a memory location of a data store of the server electronic device, and
sending the key location identifier to the electronic device, wherein the key location identifier uniquely identifies the memory location.

12. The method of claim 11, further comprising:
by the electronic device:
generating the encrypted key location identifier value by encrypting the key location identifier with the user key, and
storing the encrypted key location identifier value in a data store of the electronic device.

13. The method of claim 1, further comprising:
by the electronic device:
creating a secret backup value by combining a secret value with the password to generate a combination value, and encrypting the combination value with the password,
creating a machine-readable image that encodes the secret backup value, and
causing a print device in communication with the electronic device to print the machine-readable image onto a physical substrate.

14. The method of claim 13, wherein causing a print device in communication with the electronic device to print the machine-readable image onto a physical substrate comprises causing a print device in communication with the electronic device to print the machine-readable image onto a physical substrate without displaying the machine-readable image on a display device of the electronic device.

15. The method of claim 13, further comprising:
extracting, by a scanning device of the electronic device, a value that is encoded in the machine-readable image printed on the physical substrate;
receiving the password from the user;
decrypting the extracted value using the password to obtain a decrypted value; and
verifying that the decrypted value matches the combination value.

16. The method of claim 1, further comprising:
by the electronic device:
creating a combination value by combining the key location identifier, a delete token, and the password, and
generating a destruct backup value by encrypting the combination value with the password,
creating a machine-readable image that encodes the destruct backup value, and
causing a print device in communication with the electronic device to print the machine-readable image onto a physical substrate.

17. The method of claim 16, further comprising:
extracting, by a scanning device of the electronic device, a value that is encoded in a machine-readable image printed on a physical substrate;
receiving the password from the user;
decrypting the extracted value using the password to obtain a decrypted value;
verifying that the decrypted value matches the combination value; and
transmitting the key location identifier, the delete token and the password to the server electronic device.

18. The method of claim 17, further comprising:
by the server electronic device:
verify that the value of the delete token corresponds to information stored at a memory location of a data store of the server electronic device that corresponds to the key location identifier, and
in response to verifying that the value of the delete token corresponds to information stored at the memory location, deleting the delete token and the encrypted user key from the memory location.

19. A system for sharing of encrypted data, the system comprising:
an electronic device;
a server electronic device;
a first computer-readable storage medium comprising one or more programming instructions that, when executed, cause the electronic device to:
receive a password from a user in order to perform an action,
receive a salt value,
generate a user key using the password and the salt value,
receive an encrypted key location identifier value,
decrypt the encrypted key location identifier value to obtain a key location identifier,
receive an encrypted read token value,
decrypt the encrypted read token value using the user key to obtain a read token value,
transmit the read token value and the key location identifier to the server electronic device,
a second computer-readable storage medium comprising one or more programming instructions that, when executed cause the server electronic device to:
receive the read token value and the key location identifier from the electronic device,
verify that the read token corresponds to information stored in a memory location associated with the key location identifier, and
in response to verifying that the read token corresponds to information stored in the memory location associated with the key location identifier, transmit an encrypted encryption key to the electronic device.

20. The system of claim 19, wherein the first computer-readable storage medium further comprises one or more programming instructions that, when executed, cause the electronic device to:
receive the encrypted encryption key,
obtain an encryption key by decrypting the encrypted encryption key using the user key,
decrypt an encrypted secret value using the encryption key value to obtain a secret value, and
perform the action using the secret value.

21. The system of claim 20, wherein the first computer-readable storage medium further comprises one or more programming instructions that, when executed, cause the electronic device to delete the secret value, the password, the user key, the encryption key, the read token and the key identifier value from a data store of the electronic device.

22. The system of claim 20, wherein the one or more programming instructions that, when executed, cause the electronic device to generate a user key using the password and the salt value comprise one or more programming instructions that, when executed, cause the electronic device to append the salt value to the password.

23. The system of claim 20, wherein the first computer-readable storage medium further comprises one or more programming instructions that, when executed, cause the electronic device to enable the sharing of encrypted data by:
receiving a secret value,
generating an encryption key,
generating an encrypted secret value by encrypting the secret value with the encryption key, and
storing the encrypted secret value in a data store of the electronic device.

24. The system of claim 23, wherein the one or more programming instructions that, when executed, cause the electronic device to generate an encryption key comprise one or more programming instructions that, when executed, cause the electronic device to generate the encryption key based at least on input received from one or more of the following:
a microphone of the electronic device;
an accelerometer of the electronic device; or
a touch screen of the electronic device.

25. The system of claim 23, wherein the first computer-readable storage medium further comprises one or more programming instructions that, when executed, cause the electronic device to:
receive the password,
generate the salt value,
generate the user key using the password and the salt value, and
generate the encrypted encryption key by encrypting the encryption key with the user key.

26. The system of claim 25, wherein the first computer-readable storage medium further comprises one or more programming instructions that, when executed, cause the electronic device to:
generate a security token, a read token, and a delete token, and
transmit the encrypted encryption key, the security token, the read token, and the delete token to the server electronic device.

27. The system of claim 26, wherein the second computer-readable storage medium further comprises one or more programming instructions that, when executed, cause the server electronic device to:
write the encrypted encryption key, the security token, the read token, and the delete token to a memory location of a data store of the server electronic device; and
send the key location identifier to the electronic device, wherein the key location identifier uniquely identifies the memory location.

28. The system of claim 27, wherein the first computer-readable storage medium further comprises one or more programming instructions that, when executed, cause the electronic device to:
generate the encrypted key location identifier value by encrypting the key location identifier with the user key; and
store the encrypted key location identifier value in a data store of the electronic device.

29. The system of claim 19, wherein the first computer-readable storage medium further comprises one or more programming instructions that, when executed, cause the electronic device to:
create a secret backup value by combining a secret value with the password to generate a combination value, and encrypting the combination value with the password;
create a machine-readable image that encodes the secret backup value; and cause a print device in communication with the electronic device to print the machine-readable image onto a physical substrate.

30. The system of claim 29, wherein the one or more programming instructions that, when executed, cause the electronic device to cause a print device in communication with the electronic device to print the machine-readable image onto a physical substrate comprise one or more programming instructions that, when executed, cause the electronic device to cause a print device in communication with the electronic device to print the machine-readable image onto a physical substrate without displaying the machine-readable image on a display device of the electronic device.

31. The system of claim 29, wherein the first computer-readable storage medium further comprises one or more programming instructions that, when executed, cause the electronic device to:

extract, by a scanning device of the electronic device, a value that is encoded in the machine-readable image printed on the physical substrate;

receive the password from the user;

decrypt the extracted value using the password to obtain a decrypted value; and verify that the decrypted value matches the combination value.

32. The system of claim 19, wherein the first computer-readable storage medium further comprises one or more programming instructions that, when executed, cause the electronic device to:

create a combination value by combining the key location identifier, a delete token, and the password, generate a destruct backup value by encrypting the combination value with the password, create a machine-readable image that encodes the destruct backup value, and cause a print device in communication with the electronic device to print the machine-readable image onto a physical substrate.

33. The system of claim 32, wherein the first computer-readable storage medium further comprises one or more programming instructions that, when executed, cause the electronic device to:

extract, by a scanning device of the electronic device, a value that is encoded in a machine-readable image printed on a physical substrate;

receive the password from the user;

decrypt the extracted value using the password to obtain a decrypted value;

verify that the decrypted value matches the combination value; and transmit the key location identifier, the delete token and the password to the server electronic device.

34. The system of claim 33, wherein the second computer-readable storage medium further comprises one or more programming instructions that, when executed, cause the server electronic device to:

verify that the value of the delete token corresponds to information stored at a memory location of a data store of the server electronic device that corresponds to the key location identifier, and in response to verifying that the value of the delete token corresponds to information stored at the memory location, delete the delete token and the encrypted user key from the memory location.

* * * * *